Sept. 2, 1952  H. Z. PUSCAS  2,609,031
MOTOR-DRIVEN CHILD'S SWING
Filed Aug. 30, 1949
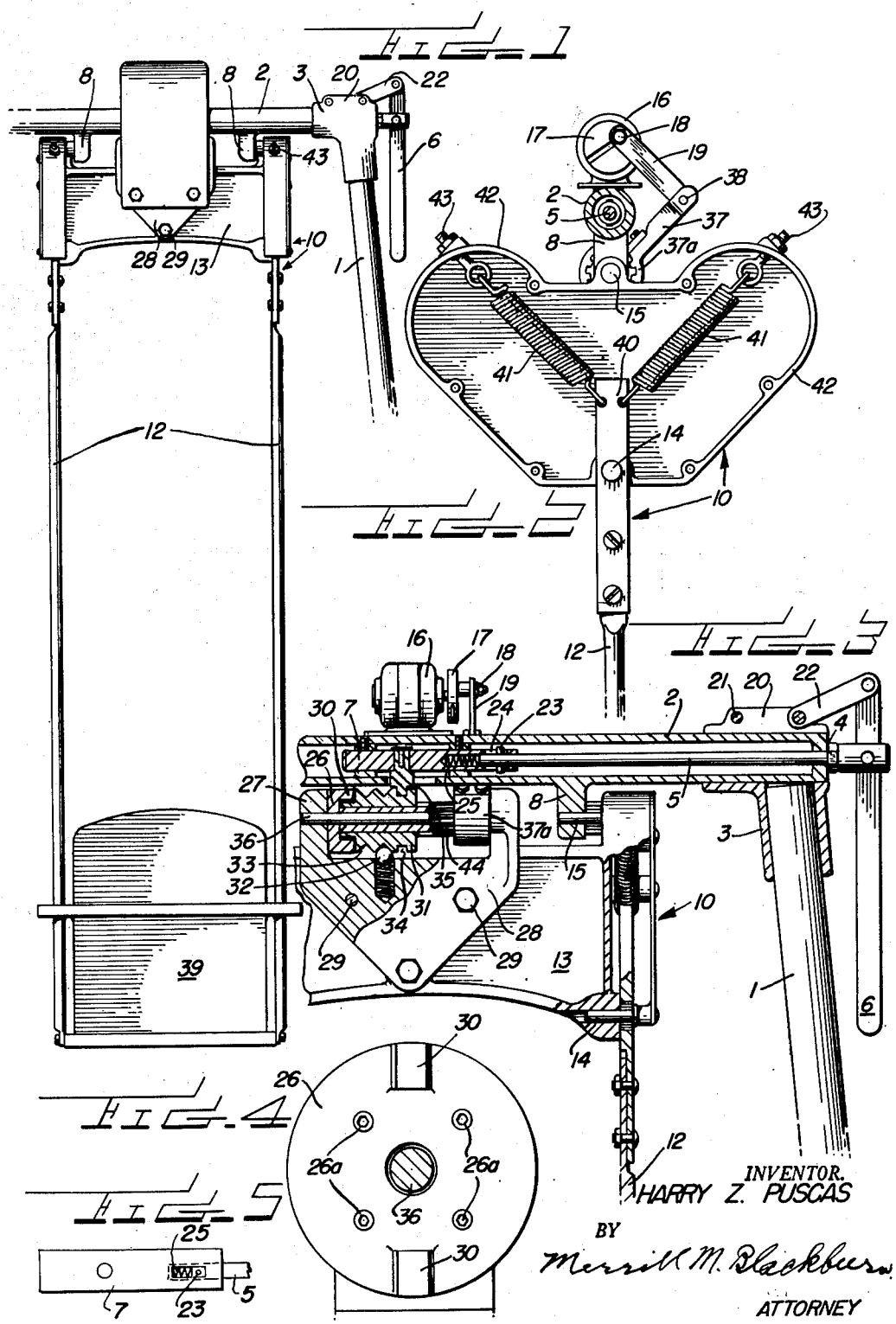
INVENTOR.
HARRY Z. PUSCAS
BY
Merrill M. Blackburn
ATTORNEY

Patented Sept. 2, 1952

2,609,031

UNITED STATES PATENT OFFICE 2,609,031

MOTOR-DRIVEN CHILD'S SWING

Harry Z. Puscas, Rock Island, Ill.

Application August 30, 1949, Serial No. 113,166

7 Claims. (Cl. 155—59)

My present invention relates to swings for use in private yards and on public playgrounds, and more especially motor operated swings. Among the objects of this invention are the provision of a swing of the type indicated in which the swinging member can yield with relation to the driving member so that the presence of an obstruction tending to stop the motor of the swing will not result in an accident or injury; the provision of a motor driven swing in which the swing may oscillate or stand still irrespective of whether the motor is running or standing still; the provision of a motor-driven swing which is provided with a clutch whereby the swinging unit may be connected or disconnected from the motor, as desired; and such further objects, advantages, and capabilities as will hereafter appear and as are inherent in the structure disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 1 represents in front elevation, fragmentarily, a structure embodying this invention;

Fig. 2 is a fragmentary elevation of this invention showing the upper part of this swing;

Fig. 3 represents a fragmentary transverse section of the upper part of a swing embodying the present invention;

Fig. 4 is a face view of a clutch element; and

Fig. 5 is a plan view of the clutch actuator.

Reference will now be made in greater detail to the annexed drawings for a more complete description of this new structure. This swing comprises a supporting framework having a pair of legs 1 connected by a crossbar 2 at the top. The legs 1 are connected to the crossbar 2 by castings 3, one end of which crossbar is closed, as shown at 4. This closure 4 has a central opening for the reception of a longitudinally reciprocable shaft 5, connected at one end to a lever 6 and at its second end to a clutch actuator 7.

The crossbar has suspending lugs 8 projecting downwardly therefrom for the suspension of the swing unit 10 which comprises the main oscillating unit 12 and the secondary unit or swinging frame 13. These two units are connected pivotally by pivot members 14, and the secondary units are connected pivotally to the suspending lugs 8 by pivot pins 15. Supported on the crossbar 2 is a motor 16, the shaft of which has mounted thereon a disc 17 which carries an eccentrically mounted pin 18. This has a link 19 pivotally connected thereto which serves to transmit force to the unit 13 for causing swinging motion of said unit 13. The motor 16 represents any motive means for causing actuation of the swing, such as a hand lever with pawl and ratchet mechanism, or power furnished by a windmill.

The castings 3 have a pair of wings 20, each, which are connected by bolts 21 whereby the castings may be drawn tightly about the crossbar 2 to cause clamping of the castings to the crossbar. Between these wings 20 are links 22 to which is pivotally connected the clutch actuator lever 6. Thus, by moving the lever toward or away from the supporting legs 1, the shaft 5 may be reciprocated to cause the clutch mechanism to function whereby to cause the clutch to be engaged or disengaged.

The shaft 5 has a hole therethrough for the reception of a pin 23 which connects the shaft 5 and the clutch actuator 7. The pin 23 as shown in Fig. 3 extends through slots 24 so there may be, to a certain degree, freedom of motion between the shaft 5 and the actuator 7. Between these two parts is located a spring means 25 which yields somewhat as the handle or lever 6 is moved toward the left, as shown in Fig. 3.

A clutch plate 26 is secured to the arm 27 of the yoke 28 which is secured to the unit 13 by bolts 29. This plate has a pair of dogs 30 which project toward the clutch member 31, held in adjusted position by the spring-pressed latching ball 32. The dogs 30 interconnect with depressions in the mating face of the clutch member 31, when the latter is shifted to clutching position, as shown in Fig. 3. The clutch member 31 has in its roughly cylindrical face transverse grooves 33 and 34, the former for engagement by the ball 32, and the latter by the finger 35. The shaft 36 is in alignment with the shaft 15, with the result that the swing unit 10 will swing about both shafts 15 and 36 as a single axis.

A lever 37 is pivotally connected at 38 to the link 19 and at its second end it is fixedly connected to the sleeve 37a, with the result that operation of the motor will cause swinging of the unit 13, as explained hereinafter. The oscillating unit 12, as pointed out above, is pivotally connected to the unit 13 by pivot members 14 and it is therefore capable of oscillating relatively to the secondary unit 13. The secondary unit 13 has main and secondary swinging units, the latter being designated 12. The upper ends of the suspension means for the chair 39 extend upwardly, as indicated at 40, beyond the pivots 14 and have springs 41 which extend diagonally upwardly for attachment to the housings 42, as shown at 43. These springs 41 tend to hold the suspension means 12 centrally positioned with relation to the housings 42 so that, when the direction of oscillation of the unit 13 is changed, there is a tendency to stop the oscillation of the suspension means 12 and cause the same to swing with the housings. However, this stop is not sudden but is cushioned by the springs 41. The result is that the person in the swing is not jolted by a sudden stop and the mechanism of the swing is not overtaxed by such sudden changes of motion.

The splined sleeve 44 has splines which fit in corresponding grooves in the clutch member 31, with the result that any oscillation of either the link 19 or the sleeve 37a will be accompanied by a similar oscillation of the other, when the clutch 26, 31 is engaged. However, when the clutch is disengaged, it is possible for the motor to run without affecting the swing, or for the swing to oscillate or to be quiet without affecting the motor. There will be no strain put upon the parts by an attempt to cause the swing to oscillate even with the motor connected, but not being driven.

When the handle 6 is moved outwardly from the legs 1, the rod 5 pulls the clutch actuator outwardly, causing the ball 32 to shift from one to the other of the grooves 33. This ball holds the clutch 26, 31 in either open or closed position.

The sleeve 37a forms an extension of the lever 37 and it is therefore oscillated by the oscillation of the link 19, causing oscillation of the swinging element. The sleeve 44 has splined connection with the sleeve 37a and, as stated above, the clutch member 31 also has splined connection to the sleeve 44, the result being that, when the sleeve 37a is oscillated, the clutch member 31 will also be oscillated. This clutch member 31 has its face, which contacts the clutch member 26, provided with notches which cooperate with the dogs 30 when the clutch member 31 is actuated into clutching position by actuating the handle 6. When the clutch is out of engagement and the motor is running, the sleeve 44 and clutch member 31 will oscillate about the shaft 36, freely, but when the sleeve 44 oscillates about the shaft 36 and the clutch member 31 is in engagement with the clutch element 26, which is secured to the yoke 28 by fastening means 26a, such oscillation causes the yoke 28 to swing, and this causes the swing to oscillate.

While I have disclosed this swing as a single unit, it will be understood that a plurality of swinging units 10, 12 may be suspended from the crossbar 2 and, in so doing, remain within the scope of the present invention.

It is of course understood that the specific description of structure set forth above may be departed from without departing from the spirit of this invention as disclosed in this specification and as defined in the appended claims.

Having now described my invention, I claim:

1. A motor driven child's swing having a supporting framework and a swinging framework comprising a main oscillating unit and a secondary unit; the swinging framework having a lever arm projecting outwardly from the upper part of the swinging framework, a motor mounted on the supporting framework and carrying an eccentric on its shaft, a link connecting the eccentric and the lever arm so that as the shaft of the motor rotates the swinging framework will be caused to oscillate about its turning axis, the lower part of the swinging framework being pivotally mounted on the upper part so that the two parts can oscillate independently of each other, the lower part of the swinging framework or main oscillating unit extending above the pivotal connection of the two parts thereof, and springs connected to the upper end portion of the main oscillating unit of said swinging framework and extending diagonally upwardly and connected to the upper part of the swinging framework whereby to yieldingly connect the upper and lower parts of the swinging framework so that shock of reversal of direction of travel of the two parts of the swinging framework will be cushioned by said springs.

2. In a motor operated swing, a supporting framework having side supports and a crossbar connecting their top parts, a swinging frame pivotally connected to said crossbar, said swinging frame having pivot members adjacent its lower parts, a main oscillating unit pivotally hung from said pivot members, spring connecting said swinging frame and said main oscillating unit, whereby to cushion the change in direction of travel of the swinging frame and the main oscillating unit, and motor means for actuating said swinging frame.

3. In a motor operated swing, a supporting framework having a crossbar for supporting a swinging frame, a motor mounted on the crossbar, said motor having an eccentric crank-pin carried by its shaft, a link connected to the crank-pin and oscillating therewith, said swinging frame pivotally suspended from the crossbar and connected to the link to be oscillated thereby as the motor operates, said swinging frame having pivots projecting laterally from its lower part upon which to suspend a main oscillating unit, said swinging element supporting said main oscillating unit on its laterally projecting pivots, and springs connecting the swinging frame and the main swing to permit relative oscillating motion thereof as the motor operates.

4. In a motor operated swing, comprising a normally fixed supporting framework having a top crossbar, the combination of a motor mounted on the crossbar, said motor having an eccentric pivot member revolving about its shaft, a swinging frame pivotally supported by said crossbar and having a linkage connection to the eccentric pivot member so that, as the motor is operated, the swinging frame will be oscillated about its pivots, said swinging frame having pivots adjacent its lower extremities for mounting a main oscillating unit pivotally, a main oscillating unit oscillatingly mounted on said pivots, said main oscillating unit having side members, and springs connecting the side members of the main oscillating unit with the swinging frame connected to said crossbar, said springs serving to cushion the stopping and starting of the swing.

5. In a motor operated swing having a supporting framework which has a crossbar across the upper portion; a swinging frame on the crossbar, a motor on the frame for oscillating the swinging frame mounted on the crossbar, the motor having on its shaft an eccentrically mounted pivot pin, pivot pins suspended from the crossbar, a swinging frame suspended from the pivot pins, a link and lever mechanism connecting the eccentric pin of the motor with the swinging frame so that, as the motor operates, the swinging frame will be caused to oscillate, the swinging frame having a main oscillating unit pivotally connected to the swinging frame, and spring means connecting the main oscillating unit and the swinging frame and tending to cause such parts to oscillate together about the pivot pins suspended from the crossbar.

6. A structure as defined by claim 5 having clutch means located between the crossbar and the swinging frame for connecting and disconnecting them so that the swinging frame may be held against oscillation or permitted to oscillate without injury to the motor.

7. In a motor operated swing, a supporting framework having side supports and a crossbar connecting their top parts, a swinging frame pivotally connected to said crossbar, said swinging frame having pivot members adjacent its lower parts, a main oscillating unit pivotally hung from said pivot members, springs connecting said swinging frame and said main oscillating unit, whereby to cushion the change in direction of travel of the main oscillating unit, and motive means for actuating the swinging frame, said means being connectible to and disconnectible from the swinging frame.

HARRY Z. PUSCAS.

REFERENCES CITED

The following references are of record in the file of this patent:

UNITED STATES PATENTS

| Number | Name | Date |
|---|---|---|
| 678,192 | Olson | July 9, 1901 |
| 1,027,157 | Schilling | May 21, 1912 |
| 1,505,117 | Withun | Aug. 19, 1924 |

FOREIGN PATENTS

| Number | Country | Date |
|---|---|---|
| 68,361 | Austria | Apr. 10, 1915 |